United States Patent
Feiling et al.

(10) Patent No.: US 12,240,050 B2
(45) Date of Patent: Mar. 4, 2025

(54) METHOD AND APPARATUS FOR MACHINING COMPONENTS BY MEANS OF ELECTROCHEMICAL MACHINING

(71) Applicant: MTU Aero Engines AG, Munich (DE)

(72) Inventors: Nicole Feiling, Munich (DE); Markus Zeis, Munich (DE); Roland Huttner, Jesenwang (DE); Christian Doll, Markt Indersdorf (DE)

(73) Assignee: MTU Aero Engines AG, Munich (DE)

( * ) Notice: Subject to any disclaimer, the term of this patent is extended or adjusted under 35 U.S.C. 154(b) by 230 days.

(21) Appl. No.: 17/628,644

(22) PCT Filed: Jul. 22, 2020

(86) PCT No.: PCT/DE2020/000164
§ 371 (c)(1),
(2) Date: Jan. 20, 2022

(87) PCT Pub. No.: WO2021/013284
PCT Pub. Date: Jan. 28, 2021

(65) Prior Publication Data
US 2022/0274195 A1    Sep. 1, 2022

(30) Foreign Application Priority Data
Jul. 23, 2019 (DE) ............ 10 2019 210 905.5

(51) Int. Cl.
*B23H 3/04* (2006.01)
*B23H 3/10* (2006.01)
*B23H 7/26* (2006.01)

(52) U.S. Cl.
CPC ............ *B23H 3/04* (2013.01); *B23H 3/10* (2013.01); *B23H 7/26* (2013.01); *B23H 2200/00* (2013.01)

(58) Field of Classification Search
CPC ... B23H 3/04; B23H 7/26; B23H 9/10; B23H 3/00–10; B23H 11/00–006
See application file for complete search history.

(56) References Cited

U.S. PATENT DOCUMENTS 3,002,907 A * 10/1961 Williams ............ B23H 3/10
                                                            204/239
3,288,699 A * 11/1966 Trager ............... B23H 9/003
                                                            204/224 M
(Continued)

FOREIGN PATENT DOCUMENTS

DE        1540723 A1    1/1970
DE        2318780 A1    10/1973
(Continued)

OTHER PUBLICATIONS

EP 2412468 A2 (Year: 2012).*

*Primary Examiner* — Brian W Cohen
(74) *Attorney, Agent, or Firm* — Hinckley, Allen & Snyder, LLP; David R. Josephs

(57) ABSTRACT

The invention relates to a method machining a particularly planar component by means of electrochemical machining, wherein the component has internal stresses resulting particularly from preceding manufacturing steps. In a first step a) of the method, the component to be machined is provided. Subsequently, in step b), at least two tools are provided in the form of electrodes and, in step c), an electrolyte is provided between the component and the at least two electrodes. In step d), a positive voltage is applied to the component and a negative voltage is applied to the at least two electrodes. Thus, in step e), by moving the at least two electrodes along their respective movement paths with respect to the component, electrochemical machining can (Continued)

take place; in the process, the gap between each electrode and the component is flushed with the electrolyte at least intermittently.

4 Claims, 2 Drawing Sheets

(56) References Cited

U.S. PATENT DOCUMENTS

| | | | | |
|---|---|---|---|---|
| 3,755,127 | A | * | 8/1973 | Tyler ............... B23H 3/10 |
| | | | | 204/224 M |
| 4,167,462 | A | | 9/1979 | Schrader et al. |
| 4,851,090 | A | | 7/1989 | Burns et al. |
| 7,204,926 | B2 | | 4/2007 | Amphere et al. |
| 8,518,223 | B2 | * | 8/2013 | Mielke ............... B23H 3/00 |
| | | | | 204/229.4 |
| 8,540,861 | B2 | | 9/2013 | Bayer et al. |
| 8,882,986 | B2 | | 11/2014 | Luo et al. |
| 2017/0066071 | A1 | | 3/2017 | Huttner et al. |
| 2018/0333810 | A1 | * | 11/2018 | Schmidt ............... F01D 9/041 |

FOREIGN PATENT DOCUMENTS

| | | | |
|---|---|---|---|
| DE | 102015102720 A1 | * | 8/2016 |
| DE | 102016124672 A1 | | 6/2018 |
| DE | 102017110733 A1 | | 11/2018 |
| DE | 112017002623 T5 | | 2/2019 |
| EP | 0098711 A1 | | 1/1984 |
| EP | 1584394 A2 | | 10/2005 |
| EP | 1593449 A2 | | 11/2005 |
| EP | 2011597 A2 | | 1/2009 |
| EP | 1652611 B1 | | 4/2011 |
| RU | 2623971 C2 | | 6/2017 |
| WO | 2012152254 A1 | | 11/2012 |
| WO | 2019210896 A1 | | 11/2019 |

* cited by examiner

METHOD AND APPARATUS FOR MACHINING COMPONENTS BY MEANS OF ELECTROCHEMICAL MACHINING

BACKGROUND OF THE INVENTION

The invention relates to a method for machining a component, particularly a planar component, by electrochemical machining, wherein the component has internal stresses resulting, in particular, from preceding manufacturing steps, as well as an apparatus for machining components by electrochemical machining.

In electrochemical machining of components, particularly planar components, which have internal stresses resulting from the prior determination thereof or resulting from preceding manufacturing steps, an asymmetric warping of the component frequently occurs. In this case, such a warping arises, in particular due to an effect on the diffusion of stress in the component that is caused by the machining, wherein internal stresses acting in the component or at least in regions of the component are triggered or at least influenced by a removal of material, resulting in extremely small compensation movements of the corresponding component regions at a location appropriate for the remaining stresses. For example, deviations from tolerance are also produced thereby due to manufacturing steps which have already been previously conducted or instabilities during the finishing of the components.

SUMMARY OF THE INVENTION

Proceeding therefrom, an object of the present invention is to propose an improved method for machining a component, in particular a planar component, by electrochemical machining, in which deviations from tolerance of components particularly having internal stresses are avoided. Further, an apparatus for machining components by electrochemical machining shall be provided. According to the invention, this is achieved by the teaching of the independent claims. Advantageous embodiments of the invention are the subject of the dependent claims.

To achieve the object, a method for machining a component, particularly a planar component, by electrochemical machining is proposed, wherein the component has internal stresses resulting, in particular, from preceding manufacturing steps. The method has the following steps:
  a) providing the component to be machined;
  b) providing at least two tools in the form of electrodes;
  c) providing an electrolyte between the component and the at least two electrodes;
  d) applying a positive voltage to the component and applying a negative voltage to the at least two electrodes; and
  e) electrochemical machining by moving the at least two electrodes along their respective movement paths with respect to the component, whereby the gap between each electrode and the component is flushed with the electrolyte at least intermittently.

It is proposed that the electrochemical machining by the at least two electrodes that are arranged distributed on the component takes place parallel in time but with electrodes separated in space, the respective movement paths of the electrodes running parallel at least in sections or extending at an angle to an axis of the component arranged in the direction of a short extension of the component.

The method is proposed for the machining of components, particularly planar components, in which, in the framework of material-removing machining in particular, an asymmetric warping of the component frequently occurs due to pre-existing internal stresses. Such planar components, in each case referred to three spatial directions arranged perpendicular to one another, usually have two directions with a long extension and one direction with a short extension with respect to the other two directions. For example, the short extension amounts to less than 50% and, in particular, to less than 30% of a long extension.

In electrochemical machining, during the movement of one electrode (cathode, tool) along its movement path, one surface of the component (anode) that faces the electrode is machined by an electrochemical process, and due to the electrolyte transferring the voltage applied between the electrode and the component, the machined particles are flushed out from the intermediate space arranged between the electrode and the component surface. The proposed method can be configured both as an ECM (electrochemical machining) method as well as a PECM (precise electrochemical machining) method. The PECM method involves an electrochemical machining method, with which a higher precision can be achieved than in a classical ECM process. In the case of PECM, pulsating working electrodes are used, whereby the gap measurement can be reduced down to approximately 10 μm. The machining of the component as well as the flushing of the gap with fresh electrolyte are conducted sequentially, whereby the machining takes place in the narrowest gap possible and the flushing occurs in the largest gap.

Due to the fact that in the proposed method, the electrochemical machining by at least two electrodes arranged distributed on the component, particularly distributed uniformly, takes place parallel in time but with electrodes separated in space, the respective movement paths of the electrodes run in parallel at least in sections, or extend at an angle to an axis of the component arranged in the direction of a short extension of the component, the internal stresses acting in the component are also correspondingly compensated or resolved, or at least reduced parallel in time and particularly distributed uniformly on the component, whereby a compensating or resolving movement also takes place parallel in time and, in particular, uniformly distributed over the component. Of course, it is also possible that with the proposed method, an electrochemical machining by more than two electrodes, such as, in particular, three, four, five, six, seven, eight, or more electrodes arranged distributed on the component takes place parallel in time and spatially separate from one another. In the same way, it is possible that an electrode also has the mating contour of two, three, four, or more such machining contours, for example, in the case of a plurality of machining contours that are to be arranged over the component. In addition to the advantageous effects of the proposed method on the actions of internal stresses in a component, a machining on a component by a plurality of electrodes that is parallel in time also makes possible a more economical manufacturing method.

In particular, in the case of a machining that takes place on the periphery of a component, the tangential portion of internal stresses in the component is reduced in the region of the machining. Due to the fact that the movement path of the electrodes runs parallel, at least in sections, or at an angle to an axis of the component arranged in the direction of a short extension of the component, during a machining on the periphery of the component, a constantly decreasing portion of the peripheral face, in which tangential stresses run, literally remains intact up to the end of the machining. Due to the higher form stability associated therewith, greater machining accuracies can be attained than in the case of a progressive machining in a direction arranged essentially perpendicular to the short extension of the component. In connection with the proposed distribution of machining positions on the component, a compensation of relaxed component regions results thereby, not a warping of the component from which tolerance deviations and instabilities result.

In one embodiment of the method for machining a component, at least one further machining step by electrochemical machining takes place by at least two electrodes, in particular arranged distributed uniformly on the periphery of the component, said machining being parallel in time and with electrodes locally separated from one another, the respective movement path of the electrodes running parallel or at an angle to an axis of the component arranged in the direction of a short extension of the component. In particular, such a further machining step can be carried out analogously to a preceding machining step, particularly with electrodes positioned differently on the component. By at least one further machining by electrochemical machining with electrodes arranged on the component, in particular offset relative to at least one preceding machining step, for example, a plurality of machinings can be carried out sequentially on the component, in which the internal stresses acting in the component are compensated or reduced parallel in time and in particular uniformly on the component, so that for example, a compensation of stresses of component regions does not result in a warping of the component.

In one embodiment of the method for machining a component, the component is essentially configured in a rotationally symmetric form, and the movement paths of the at least two electrodes run in a cylinder surface arranged coaxially to the component. In this way, for example, machining contours aligned axially or inclined on the peripheral face, such as straight or helical teeth, or, by interacting with an active axis of the workpiece holder, for example, machining contours running spirally at the periphery of the component can also be manufactured. As already described, in this case, during a machining on the periphery of the component, a constantly decreasing portion of the peripheral face, in which tangential stresses run, essentially remains intact up to the end of the machining. Thus, parallel to the lowering of an electrode, the tangential portion of the internal stresses is reduced in the component in the region of the machining, whereby high machining accuracies can be achieved.

In one embodiment of the method for machining a component, the component is essentially configured in a rotationally symmetric form, and the movement paths of the at least two electrodes run in a hollow cylinder arranged coaxially to the component. By these variants, in addition to the previously mentioned embodiment, for example, machining contours of inclined form radially to the peripheral face can also be provided. Here also, of course, an interaction with an active axis of the workpiece holder is also possible, in order to arrange, for example, three-dimensional freeform faces on a component.

In one embodiment of the method for machining a component, the electrolyte is fed integrally through the at least one electrode, or in the counterflow method, through a pressure chamber arranged between component and electrode. The electrolyte feed to the machining site is selected as a function of the geometric properties and the accessibility of the pressure chamber. In this case, a reliable flushing of the pressure chamber and thus a reliable entrainment of material residues therefrom is necessary for achieving a high machining quality.

In another aspect, an apparatus for machining components by electrochemical machining is proposed. The apparatus comprises:
- a machining station, in which a component to be machined can be rigidly held;
- at least two tools, particularly arranged distributed uniformly on the component, these tools being in the form of electrodes, which can be moved with respect to a component held in the machining station;
- a device for providing fresh electrolyte for the provision and feed of fresh electrolyte between the component and the at least two electrodes during the machining process;
- a device for removing spent electrolyte for removing and storing spent electrolyte;
- a current supply device having a control device for applying a positive voltage to the component and for applying a negative voltage to the at least two electrodes; and
- at least one access site for the machining station, by which the component and/or the machining station is accessible to operating personnel and/or at least one manipulating apparatus.

In the proposed apparatus, the device for providing fresh electrolyte is arranged on a first side and the device for removing spent electrolyte is arranged on a second side adjacent to the machining station, and at least one access to the machining station is arranged between the device for providing fresh electrolyte and the device for removing spent electrolyte.

The apparatus is also particularly suitable for carrying out the above-described method for machining a component. A component to be machined can be rigidly held in a machining station of the apparatus. For example, the machining station is designed so that planar components can be held therein in a horizontal alignment, in which the at least one shorter extension of the component is arranged vertically. The at least two tools, particularly arranged distributed uniformly on the component, these tools being in the form of electrodes, can be moved with respect to the component held in the machining station. For this purpose, the tools have drive devices particularly aligned essentially vertical, which make possible a compact construction of the apparatus. Of course, a design of the apparatus is also possible, in which the tools are arranged rigidly and during machining, the component held rigidly in the machining station is moved with respect to the tools. Additionally, designs of the tool machine are also possible, in which the machining station has at least one active axis, particularly an axis of rotation. In the case of embodiments that have drive devices on at least two tool guides and the machining station, the movements of the tools and the component being machined can be superimposed.

The apparatus has at least two tools, particularly arranged distributed uniformly on the component, these tools being in the form of electrodes, which can be moved with respect to a component held in the machining station. Likewise, it is possible to provide a machining, in which more than two tools are used, which are arranged distributed on the component, particularly three, four, five, six, seven, eight or more, so that the apparatus can have drive devices for the specific number of electrodes. This makes possible a time-parallel machining at several positions of a component based on several electrodes and thus a more economical manufacturing process.

The apparatus further has a device for providing fresh electrolyte for providing and feeding fresh electrolyte, which is fed between the component and the at least two electrodes, in particular, into the pressure chamber, during the machining process, in order to transfer the voltage between cathode (tool) and anode (component), on the one hand, and, on the other hand, to remove residues of the machining process from the pressure chamber. Then, for removing and storing the spent electrolyte containing machining residues, in particular machined material particles, from the component or from the at least two electrodes during and after the machining process, the apparatus has a device for removing spent electrolyte.

In addition, a current supply device with a control device for applying a positive voltage to the component and for applying a negative voltage to the at least two electrodes is provided on the apparatus. In this case, it is provided that the admissible current load on the component can be determined by selection of the parameters and/or the number of engaged electrodes, so that any disruption can be precisely assigned to the electrode causing it.

The apparatus further has at least one access to the machining station, by which the component and/or the machining station is accessible to operating personnel and/or at least one manipulating apparatus.

In order to make possible a compact construction of the apparatus, which additionally has good accessibility to the machining station, it is proposed to arrange the device for providing fresh electrolyte next to a first side and the device for removing spent electrolyte next to a second side also adjacent to the machining station, wherein the device for providing fresh electrolyte is arranged particularly spatially distant from the device for removing spent electrolyte. In this case, particularly relative to the machining station, the first side with the device for providing fresh electrolyte is arranged lying opposite to the second side with the device for removing spent electrolyte. Thus, a clear spatial separation of the device for providing fresh electrolyte and the device for removing spent electrolyte can result, whereby the supplying and maintenance of the two devices is facilitated.

In this case, at least one access to the machining station is arranged between the device for providing fresh electrolyte and the device for removing spent electrolyte. Since the devices for electrolyte supply and the devices associated with their storage and feed have a relatively large space requirement due to the necessary quantity of electrolyte and the machining station should be as easily accessible as possible, it is proposed to arrange at least one access to the machining station of the apparatus between the two devices for supplying electrolyte. In this way, at least one access to the machining station is free from supply devices for the electrolyte.

Basically, the apparatus for machining components by electrochemical machining is suitable for executing the above-described method for machining a component. The features of the method named in the preceding description can therefore be realized with at least one embodiment and devices of the proposed apparatus.

In one embodiment of the apparatus for machining components by electrochemical machining, the respective movement path of the electrodes that are movable with respect to the component held in the machining station run parallel or at an angle to the vertical, at least in sections. Such drives or guide devices for guiding movements of electrodes running essentially vertical or at an angle to the vertical have a small horizontal extension. Thus, such an embodiment makes possible a compact configuration of the apparatus.

In the case of one embodiment of the apparatus for machining components by electrochemical machining, the machining station has an active axis of rotation. By an active axis of rotation of the machining station, in particular by interacting with at least one electrode guided on a movement path with respect to the component, a plurality of machining geometries can be implemented on the component.

In one embodiment of the apparatus, the latter has two accesses that are arranged lying opposite one another on the machining station, and each of these accesses is arranged between the device for providing fresh electrolyte and the device for removing spent electrolyte. Two opposite-lying accesses to the machining station make possible a good accessibility to the component and to the tools. Particularly in the case of a multiple machining by more than two electrodes, such as, in particular, three, four, five, six, seven, eight or more electrodes arranged on the component, a good accessibility to each of the electrodes is necessary as much as possible. An apparatus with two opposite-lying accesses to the machining station makes possible a good accessibility from two sides to the machining positions and to the tools.

In one embodiment of the apparatus for machining components, elements of the current supply device are arranged adjacent to the device for providing fresh electrolyte and/or adjacent to the device for removing spent electrolyte, so that the at least one access to the machining station between the device for providing fresh electrolyte and the device for removing spent electrolyte remains free. This embodiment makes possible a more compact construction of the apparatus by arranging the current supply devices so that the access to the machining station is not limited by these latter.

In one embodiment of the apparatus for machining components, the at least one access to the machining station essentially extends over the width of the machining station. Such an embodiment further improves a good access to the machining station, in particular to the component and the tools held therein.

In one embodiment of the apparatus for machining components, in each case, between elements of the current supply device arranged adjacent to the device for providing fresh electrolyte and/or adjacent to the device for removing spent electrolyte, an access is arranged to the device for providing fresh electrolyte and/or to the device for removing spent electrolyte. This embodiment makes possible a more compact construction of the apparatus by arranging the current supply devices so that the access to the devices for providing electrolyte is not limited by these current supply devices.

BRIEF DESCRIPTION OF THE DRAWING FIGURES

Further features, advantages and application possibilities of the invention result from the following description in connection with the figures. Herein:

FIG. 1B shows a schematic three-dimensional representation of the exemplary apparatus according to the invention from FIG. 1a.

DESCRIPTION OF THE INVENTION

Figure 1A:
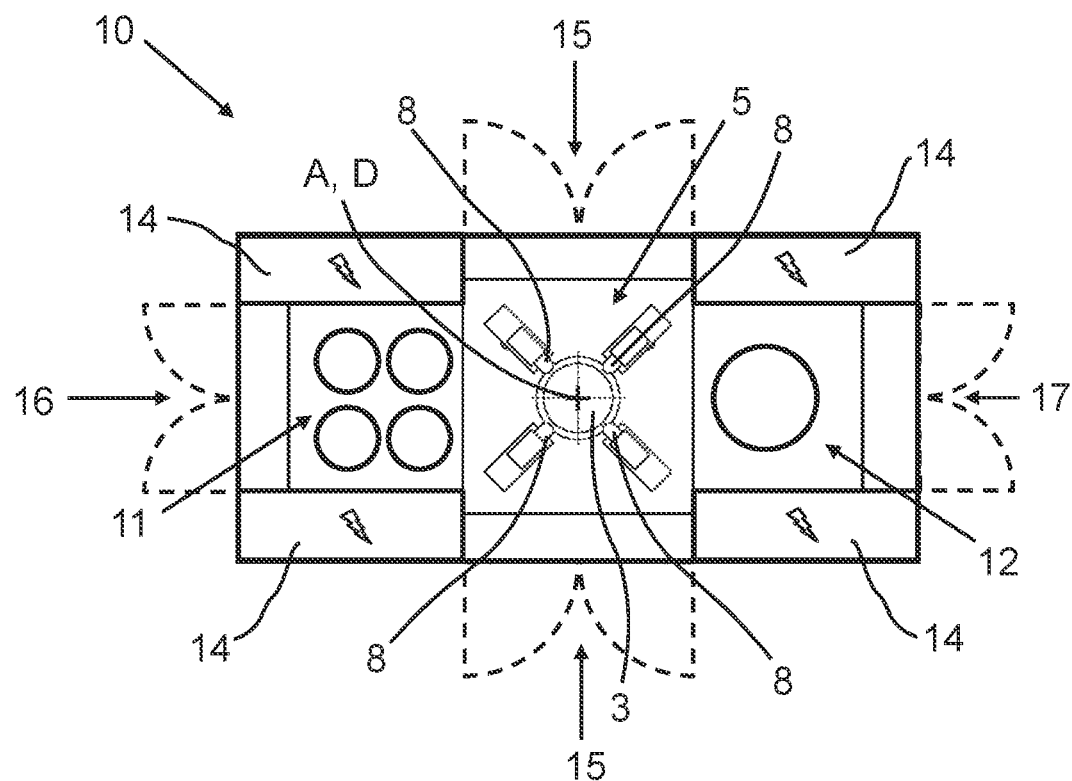
FIG. 1a shows a schematic representation of an exemplary apparatus according to the invention for machining components by electrochemical machining in a view from above.

FIG. 1a shows a schematic representation of an exemplary apparatus 10 according to the invention for machining components by electrochemical machining. The apparatus has a machining station 5, in which a component 3 to be machined can be rigidly held and four tools in the form of electrodes 8 that are arranged uniformly distributed, by way of example, on the component 3, the electrodes being able to move with respect to a component 3 held in the machining station 5. The component 3 held in the machining station 5 is formed disk-shaped, so that the component axis A runs in the direction of the short extension of the component 3. At the left in FIG. 1, next to the machining station 5, there is arranged a device for providing fresh electrolyte 11, which serves for providing and feeding fresh electrolyte between the component 3 and the electrodes 8 during the machining process. In this case, the exemplary apparatus 10 has four fresh-electrolyte pumps, so that each electrode 8 can be supplied by a separate fresh-electrolyte pump. A device for removing spent electrolyte 12, which serves for removing and storing spent electrolyte from the component 3 and/or from the electrodes 8 during and after the machining process, is arranged at the right next to the machining station 5, and has only one spent-electrolyte pump, which feeds back the spent electrolyte.

On the exemplary apparatus 10, two opposite-lying accesses 15 to machining station 5 are arranged, by which the component 3 or the machining station 5 is accessible to operating personnel 2 (FIG. 1B), and/or at least one manipulating apparatus, such as a crane or a feeder. In the exemplary apparatus 10 according to the invention, the device for providing fresh electrolyte 11 is arranged on a first side adjacent to machining station 5, and the device for removing spent electrolyte is arranged on a second side adjacent to the machining station 5. Further, the two accesses 15 to the machining station 5 are arranged between the device for providing fresh electrolyte 11 and the device for removing spent electrolyte 12, and essentially extend over the width of the machining station 5.

The apparatus 10 further has a current supply device 14 that is arranged distributed on the apparatus and that has a control device and the necessary equipment for applying a positive voltage to the component 3 and for applying a negative voltage to the electrodes 8. The elements of the current supply device 14 in this case are arranged adjacent to the device for providing fresh electrolyte 11 and the device for removing spent electrolyte 12, whereby the accesses 15 to the machining station 5 between the device for providing fresh electrolyte 11 and the device for removing spent electrolyte 12 remain free. Additionally, an access 16 to the device for providing fresh electrolyte 11 remains free between elements of the current supply device 14 that are arranged adjacent to the device for providing fresh electrolyte 11, and in the same way, an access 17 to the device for removing spent electrolyte 12 remains free between elements of the current supply device 14 that are arranged adjacent to the device for removing spent electrolyte 12.

The electrodes 8 of the apparatus 10 can travel perpendicular to the plane of the drawing of FIG. 1, so that the movement path thereof runs in the vertical direction with respect to the component 3 held in the machining station 5. Additionally, the machining station 5 has an active axis of rotation D overlying the component axis A, whereby, in addition to axis-parallel recesses or recesses formed obliquely to the axis ("crooked") for this purpose, for example, a spiral-shaped machining can also be produced at the periphery of a rotationally symmetric component 3.

Figure 1B:
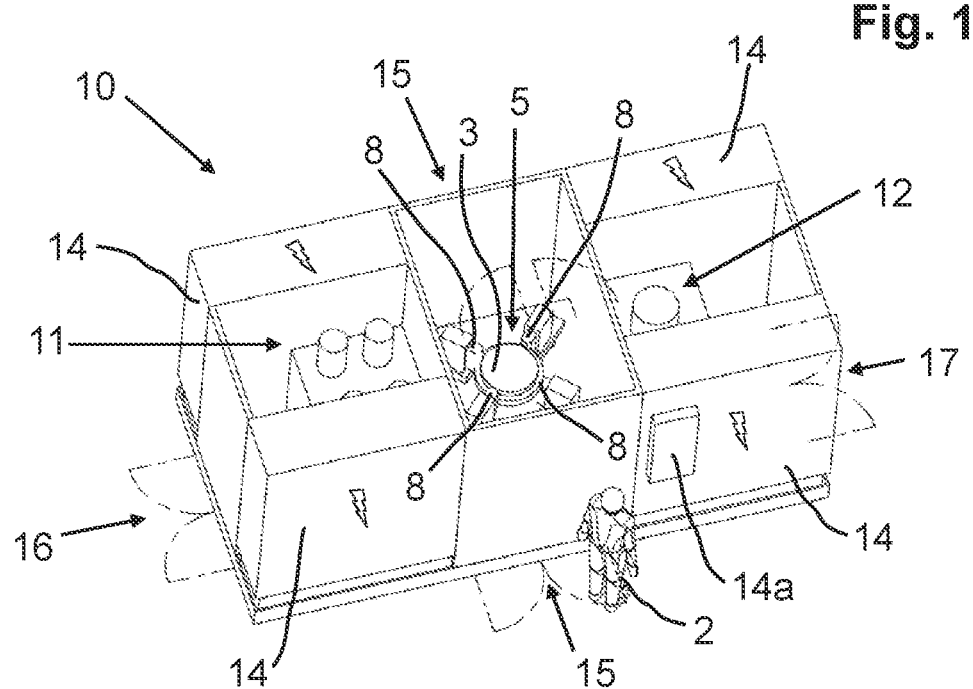

FIG. 1B shows a schematic three-dimensional representation of the exemplary apparatus according to the invention from FIG. 1a, wherein identical elements are referred to by the same reference numbers. In addition, in FIG. 1B, an operator 2 of the apparatus 10 is shown as well as an operator interface 14a of the control device of the current supply device 14.

Figure 2:
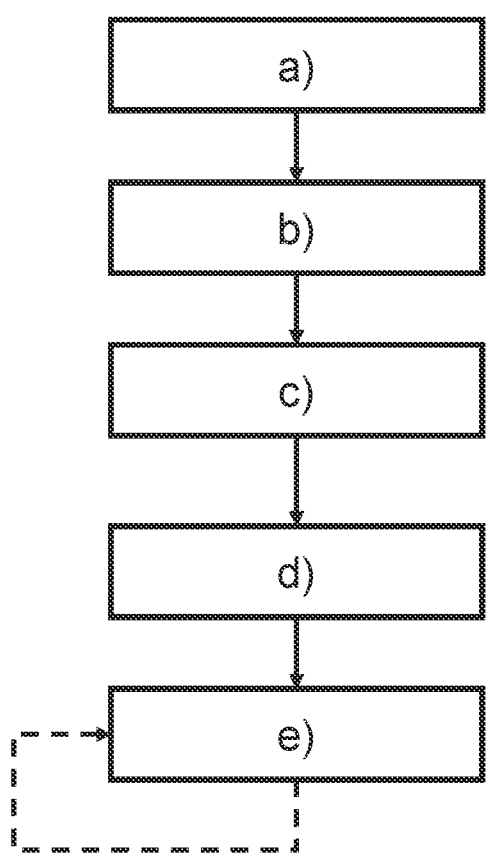
FIG. 2 shows a schematic representation of the sequence of the method according to the invention.

In FIG. 2, the sequence of the method according to the invention for machining a component 3, particularly a planar component, by electrochemical machining, wherein the component 3 has internal stresses resulting, in particular, from preceding manufacturing steps, is shown schematically. For example, the method can be carried out with an apparatus 10, as it is shown and described by way of example in FIGS. 1a and 1b. The method has the following steps:

In a first step a), the component 3 to be machined is provided. Subsequently, in step b) at least two tools are provided in the form of electrodes 8, and in step c) an electrolyte is provided between the component 3 and the at least two electrodes 8. In step d) a positive voltage is applied to the component 3 and a negative voltage is applied to the at least two electrodes 8. Thus, in step e), by moving the at least two electrodes 8 along their respective movement path with respect to the component 3, an electrochemical machining can take place; in this case, the gap between each electrode 8 and the component 3 is flushed with the electrolyte at least intermittently. Here, the electrochemical machining by the at least two electrodes 8 that are arranged distributed on the component 3 takes place parallel in time and with electrodes separated in space from each other, the respective movement paths thereof running parallel at least in sections, or running at an angle to an axis A of the component arranged in the direction of a short extension of the component 3.

Alternatively, in another machining step e), a further electrochemical machining can be carried out by at least two electrodes that are arranged distributed on the periphery of the component 3, said machining also being parallel in time and with electrodes locally separated from one another. In this case, the respective movement path of the at least two electrodes 8 also runs parallel or at an angle to an axis A of the component 3 arranged in the direction of a short extension of the component 3. The axis A of the component 3 is arranged vertically and, in the apparatus shown in FIGS. 1a and 1b, corresponds to the active axis of rotation D of the machining station 5.

What is claimed is:

1. A method for machining a substantially planar component by electrochemical machining, wherein the component has internal stresses resulting from preceding manufacturing steps, comprising the steps of:
   a) providing a rotationally symmetrical component; the rotationally symmetrical component having a peripheral cylindrical face to be machined;
   b) providing at least two tools in the form of electrodes having respective adjustable drive devices therefor;
   c) providing an electrolyte between the component and the at least two electrodes;
   d) applying a positive voltage to the component and applying a negative voltage to the at least two electrodes;

e) electrochemical machining by moving the at least two electrodes along their respective movement paths with respect to the peripheral cylindrical face of the component via the adjustable respective drive devices, wherein the respective movement paths of the at least two electrodes during the electrochemical machining are coaxial to the component, and whereby a gap between each electrode and the component is flushed with the electrolyte at least intermittently;

wherein the electrochemical machining by the at least two electrodes that are arranged distributed on the component takes place parallel in time and with electrodes separated in space from each other, the respective movement paths thereof running parallel at least in sections or at an angle to an axis of the component arranged in the direction of a short extension of the component via the adjustable respective drive devices;

wherein machining of the peripheral cylindrical face of the rotationally symmetrical component provides a constantly decreasing portion of the peripheral cylindrical face, in which tangential stresses run, remains intact during the machining, the tangential portion of the stresses being reduced in the component in the peripheral cylindrical region of the machining.

2. The method for machining according to claim 1, further comprising at least one further machining step by electrochemical machining, which takes place parallel in time and with electrodes spatially separated from one another, by at least two electrodes arranged distributed on the periphery of the component, the respective movement path running parallel or at an angle to an axis of the component arranged in the direction of a short extension of the component.

3. The method for machining according to claim 1, wherein the movement paths of the at least two electrodes run in a hollow cylinder surface coaxially to the component.

4. The method for machining according to claim 1, wherein the electrolyte is guided integrally through the at least one electrode, or in a counterflow method, through a pressure chamber arranged between the component and the electrodes.

* * * * *